United States Patent
Ke et al.

(10) Patent No.: US 10,797,593 B1
(45) Date of Patent: Oct. 6, 2020

(54) KAPPA SWITCHING DC-DC CONVERTER WITH CONTINUOUS INPUT AND OUTPUT CURRENTS

(71) Applicant: Analog Devices International Unlimited Company, Limerick (IE)

(72) Inventors: Xugang Ke, Santa Clara, CA (US); Min Chen, Fremont, CA (US); Shuilin Tian, Milpitas, CA (US); Keith Szolusha, Saratoga, CA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/391,664

(22) Filed: Apr. 23, 2019

(51) Int. Cl.
*H05B 33/08* (2020.01)
*H05B 45/37* (2020.01)
*H02M 1/08* (2006.01)
*H02M 3/07* (2006.01)
*H02M 1/00* (2006.01)

(52) U.S. Cl.
CPC ............ *H02M 3/07* (2013.01); *H02M 1/08* (2013.01); *H05B 45/37* (2020.01); *H02M 2001/0009* (2013.01)

(58) Field of Classification Search
CPC ........ H05B 33/08; H05B 37/02; H05B 45/37; H05B 45/375; H05B 45/38; H02M 1/08; H02M 3/07; H02M 3/155; H02M 3/1582; H02M 1/4225; H02M 2001/4291; H02M 2001/0009
See application file for complete search history.

(56) References Cited

U.S. PATENT DOCUMENTS

| | | | |
|---|---|---|---|
| 4,713,742 A | 12/1987 | Parsley | |
| 6,239,584 B1 | 5/2001 | Jang et al. | |
| 6,252,383 B1 | 6/2001 | Wittenbreder | |
| 7,078,882 B2* | 7/2006 | Weng | H02M 1/34 323/224 |
| 8,018,740 B2* | 9/2011 | Sun | H02M 3/33569 363/131 |

(Continued)

FOREIGN PATENT DOCUMENTS

CN 101373933 11/2011

OTHER PUBLICATIONS

Beiranvand, Reza, "Using LLC Resonant Converter for Designing Wide-Range Voltage Source", IEEE Transactions on Industrial Electronics, 58(5), (May 2011), 1746-1756.

(Continued)

*Primary Examiner* — Thai Pham
(74) *Attorney, Agent, or Firm* — Schwegman Lundberg & Woessner, P.A.

(57) ABSTRACT

The Kappa converter circuit, as introduced herein, can be configured for step-down (buck), step-up (boost), or buck-boost operation. The Kappa converter circuit exhibits lower electromagnetic interference (EMI) relative to other buck, boost, or buck-boost topologies, such as without additional input or output filter circuits. The Kappa converter circuit can have high power handling capability and less DCR loss, for example due to a distribution of current signals through respective inductors. The Kappa converter circuit includes isolating inductors at its input and ground reference nodes to help reduce signal bounce or signal pulsations at supply and ground reference busses, thereby further reducing EMI noise due to switching in the circuit. When the Kappa converter is configured for step-up operation, the converter exhibits no right-half-plane (RHP) zero.

18 Claims, 11 Drawing Sheets

(56) References Cited

U.S. PATENT DOCUMENTS

| | | | |
|---|---|---|---|
| 8,350,538 B2 | 1/2013 | Cuk | |
| 2011/0148200 A1* | 6/2011 | Burns | H03K 17/102 |
| | | | 307/43 |
| 2014/0375251 A1* | 12/2014 | Sakai | H02J 50/05 |
| | | | 320/107 |
| 2015/0002214 A1* | 1/2015 | Englekirk | H03L 7/0891 |
| | | | 327/536 |
| 2016/0149501 A1* | 5/2016 | Dai | H02M 3/07 |
| | | | 363/21.02 |
| 2016/0315545 A1* | 10/2016 | Kovacevic | H02M 3/33523 |
| 2017/0201177 A1* | 7/2017 | Kesarwani | H02M 3/158 |
| 2019/0393782 A1* | 12/2019 | Teplechuk | H02M 3/156 |
| 2020/0083805 A1* | 3/2020 | Mauri | H02M 3/1582 |

OTHER PUBLICATIONS

Falin, Jeff, "Designing DC DC converters based on ZETA topology", Analog Application Journal, Texas Instruments Inc., (2010), 8 pgs.

Hameed, Faizan, "ZETA Converter based charge controller for efficient use of solar energy in street lighting system", Intl. Journal of Advanced Research in Electrical, Electronics and Instrumentation Engineering, 5(6), (Jun. 2016), 13 pgs.

Jabbari, Masoud, "Resonant CLL Non-Inverting Buck-Boost Converter", Journal of Power Electronics, 13(1), (Jan. 2013), 8 pgs.

Jin, Ke, "Zero-Voltage-Switching Multiresonant Three-Level Converters", IEEE Transactions on Industrial Electronics, 54(3), (Jun. 2007), 705-1715.

Lu, Bing, "Optimal Design Methodology for LLC Resonant Converter", IEEE Applied Power Electronics Conference and Exposition, (2006), 6 pgs.

Rohini, G., "High Efficient DC-DC Converter for Portable Device", ARPN Journal of Engineering and Applied Sciences, 13(11), (Jun. 2018), 3765-3769.

Tymerski, Richard, "Generation, Classification and Analysis of Switched-Mode DC-to-DC Converters by the Use of Converter Cells", IEEE Intl. Telecommunications Energy Conference, (1986), 181-195.

\* cited by examiner

US 10,797,593 B1

KAPPA SWITCHING DC-DC CONVERTER WITH CONTINUOUS INPUT AND OUTPUT CURRENTS

BACKGROUND

Power systems can include one or more voltage or current converter circuits. A converter circuit can receive an electrical input signal having various input signal characteristics such as magnitude, frequency, and/or phase. In response to the input signal, the converter circuit can provide an electrical output signal, such as having characteristics that are similar or different to those of the input signal.

Power systems can include one or more switches configured to adjust an output signal magnitude, frequency, and/or phase. Some power systems can include an isolation circuit, such as a transformer, to electrically isolate a converter output stage from a converter input stage using respective sides of the transformer.

Switched-mode converter circuits, or switching regulators, can provide power conversion, such as including output signal voltage or output current regulation, using transistor switches that are either on or off. That is, in a switched-mode converter, the transistors may not operate in a linear region in which both switch current and switch voltage are nonzero. In an example, at least one of transistor current and transistor voltage is close to zero at all times, and accordingly power dissipation is minimized.

In an example, a switching regulator is configured to generate a regulated voltage. For example, a switching regulator can include one or more switches that can be turned on or off according to a duty cycle. The duty cycle of the switches can be selected to control or regulate the output voltage. Examples of switching regulators include, for example, DC-DC converters such as buck converters and boost converters. Such converters can be used to convert a direct current (DC) signal from one voltage level to another. DC-DC converters can be useful in applications that use multiple sub-systems, such as can use or operate at different voltage levels.

Some DC-DC converters can include or use a magnetic energy storage element, such as one or more inductors or transformers. In such an example, a converter output voltage can be controlled by modulating a duty cycle of the signal(s) used to control power switches for charging or discharging the inductive component(s). In an example, a buck converter or a boost converter can include or use a magnetic energy storage element.

Power converters can be configured for continuous or discontinuous operation. In an example, a converter configured for continuous operation can provide a continuous current or voltage output, such as can be desired or required for various supply-sensitive applications. In an example, a continuous operation mode can exhibit reduced noise, or reduced electromagnetic interference (EMI), as compared to a discontinuous mode. In an example, EMI noise generated by a converter can be detected on a supply rail or ground rail, and such noise can be undesirable or detrimental for some applications. Some converter circuits include or use various filters to help smooth output signals or reduce EMI effects, however such filters can increase system size and cost.

OVERVIEW

The present inventor has recognized, among other things, that a problem to be solved includes providing a power converter circuit that can operate in multiple different modes. For example, the problem can include providing a converter that can be configured for step-up and step-down power conversion. In an example, the problem includes providing a switching converter that introduces limited noise and includes a relatively simple to use control scheme. In an example, the problem includes providing a converter with a non-inverting output using a minimum number of standard circuit components, and further includes providing a continuous output signal with low ripple and minimal output filtering.

In an example, a solution to the above-described problem can include or use a Kappa converter circuit. The Kappa converter circuit is introduced herein. In an example, the Kappa converter circuit can be configured for step-down (buck), step-up (boost), or buck-boost operation. In an example, the converter circuit can have low DC resistance loss characteristics, and the converter circuit can use inductors to provide isolation between switching devices in the converter and one or more bus lines. In an example, the Kappa converter circuit can include or use a relatively simple to use control scheme with a minimum number of switches. In an example, the Kappa converter circuit can provide a non-inverted output signal relative to a signal at the input of the converter circuit. That is, the Kappa converter circuit can provide an output signal that has the same polarity as its corresponding input signal. The Kappa converter circuit can provide substantially continuous input and output current with minimal ripple and without requiring large capacitive filters at the input and output nodes.

Aspect 1 can include or use subject matter (such as an apparatus, a system, a device, a method, a means for performing acts, or a device readable medium including instructions that, when performed by the device, can cause the device to perform acts, or an article of manufacture), such as can include or use a bidirectional transformerless switching power converter system that is operable in a first mode in which a power signal flows in a power signal path from a first node to a second node to provide a stepped-down power signal at the second node, and the power converter system is operable in a second mode in which a different power signal flows in the power signal path from the second node to the first node to provide a stepped-up power signal at the first node. In Aspect 1, the power converter system can include a switching circuit coupled to the second node, a capacitor provided in parallel with the switching circuit, a first inductor coupled between a first terminal of the capacitor and the first node, and a second inductor coupled between a second terminal of the capacitor and a reference node.

Aspect 2 can include or use, or can optionally be combined with the subject matter of Aspect 1, to optionally include the switching circuit including a first switch in a signal path between the first terminal of the capacitor and the second node, and a second switch in a signal path between the second terminal of the capacitor and the second node.

Aspect 3 can include or use, or can optionally be combined with the subject matter of one or any combination of Aspects 1 or 2 to optionally include or use, in the first mode, the system is configured as a single-phase step-down converter that is configured to receive a higher voltage input signal at the first node and provide a lower voltage output signal at the second node.

Aspect 4 can include or use, or can optionally be combined with the subject matter of one or any combination of Aspects 1 through 3 to optionally include or use, in the second mode, the system is configured as a single-phase step-up converter that is configured to receive a lower voltage input signal at the second node and provide a higher voltage output signal at the first node.

Aspect 5 can include or use, or can optionally be combined with the subject matter of one or any combination of Aspects 1 through 4 to optionally include or use a control circuit configured to provide switch control signals to respective switches in the switching circuit to configure the converter system to operate in the first mode or the second mode.

Aspect 6 can include or use, or can optionally be combined with the subject matter of Aspect 5, to optionally include or use the control circuit configured to receive a power supply signal from a supply node, wherein the supply node is coupled to the first terminal of the capacitor.

Aspect 7 can include or use, or can optionally be combined with the subject matter of one or any combination of Aspects 5 or 6 to optionally include the control circuit receiving operating power from a node in the power signal path.

Aspect 8 can include or use, or can optionally be combined with the subject matter of Aspect 7, to optionally include the capacitor as a flying capacitor and the control circuit receiving power from the first and different second terminals of the flying capacitor.

Aspect 9 can include or use, or can optionally be combined with the subject matter of one or any combination of Aspects 1 through 8 to optionally include or use an output capacitor coupled between the first and second nodes, and wherein the system is operable in a buck-boost mode to provide a continuous output signal across the output capacitor.

Aspect 10 can include or use, or can optionally be combined with the subject matter of one or any combination of Aspects 1 through 9 to optionally include, in the first mode, an output signal at the second node having the same polarity as its corresponding input signal at the first node, and in the second mode, an output signal at the first node having the same polarity as its corresponding input signal at the second node.

Aspect 11 can include or use, or can optionally be combined with the subject matter of one or any combination of Aspects 1 through 10 to optionally include, in the first mode, the system is configured to provide a continuous output signal at the second node, and wherein in the second mode, the system is configured to provide a continuous output signal at the first node.

Aspect 12 can include, or can optionally be combined with the subject matter of one or any combination of Aspects 1 through 11 to include or use, subject matter (such as an apparatus, a method, a means for performing acts, or a machine readable medium including instructions that, when performed by the machine, that can cause the machine to perform acts), such as can include or use a packaged, transformerless, switching power converter system operable in step-down (buck), step-up (boost), and/or step-up/step-down (buck-boost) converter modes. In an example, Aspect 12 can include a dual-purpose first terminal configured to (a) in a buck converter mode, receive a high voltage first input signal, or (b) in a boost converter mode, provide a stepped-up output signal relative to a low voltage second input signal. Aspect 12 can include a dual-purpose second terminal configured to (a) in the buck converter mode, provide a stepped-down output signal relative to the high voltage first input signal, or (b) in the boost converter mode, receive the low voltage second input signal. Aspect 12 can include a first switch coupled to the dual-purpose second terminal and configured to selectively pass signals to or from the dual-purpose first terminal, and a second switch coupled to the dual-purpose second terminal and configured to selectively pass signals to a reference node.

Aspect 13 can include or use, or can optionally be combined with the subject matter of Aspect 12, to optionally include or use a control signal input and a control circuit configured to receive a control signal from the control signal input and, in response, control the first switch and the second switch to operate the system in one of the buck, boost, and/or buck-boost converter modes.

Aspect 14 can include or use, or can optionally be combined with the subject matter of one or any combination of Aspect 12 or Aspect 13 to optionally include or use a first inductor coupled between the dual-purpose first terminal and the first switch, and a second inductor coupled between the second switch and the reference node.

Aspect 15 can include or use, or can optionally be combined with the subject matter of Aspect 14, to optionally include or use a capacitor coupled between the first and second inductors. The capacitor can be a flying capacitor with a voltage level that floats according to operation of the converter.

Aspect 16 can include or use, or can optionally be combined with the subject matter of one or any combination of Aspects 12 through 15 to optionally include, in the buck converter mode, the second terminal is configured to provide a continuous and non-inverted output current signal relative to the high voltage first input signal, and in the boost converter mode, the first terminal is configured to provide a continuous and non-inverted output current signal relative to the low voltage second input signal.

Aspect 17 can include or use, or can optionally be combined with the subject matter of one or any combination of Aspects 12 through 16 to optionally include or use a sensing resistor configured to monitor a current in the converter. In an example, the sensing resistor can be coupled to the first terminal. Aspect 17 can include one or more LED devices coupled between the sensing resistor and the second terminal, and the control circuit can be configured to receive information about a current signal in the resistor and, in response, control the first and second switches to provide a substantially continuous power signal to the one or more LED devices at the first terminal.

Aspect 18 can include, or can optionally be combined with the subject matter of one or any combination of Aspects 1 through 17 to include or use, subject matter (such as an apparatus, a method, a means for performing acts, or a machine readable medium including instructions that, when performed by the machine, that can cause the machine to perform acts), such as can include or use a method for stepping up or stepping down a power signal using a converter system having a dual-purpose first node, a dual-purpose second node, a switching circuit including first and second switches, a capacitor provided in parallel with the switching circuit, a first inductor coupled between a first terminal of the capacitor and the first node, and a second inductor coupled between a second terminal of the capacitor and a reference node. In an example, Aspect 18 can include, in a step-down mode, controlling the first switch in a first power signal path to change an amount of a first power signal flowing from the first inductor to the second node, and controlling the second switch in a shunt path to change an amount of the power signal flowing from a reference node to the second node. Aspect 18 can include, in a step-up mode, controlling the first switch in the first power signal path to change an amount of a power signal flowing from the second node to the first inductor, and controlling the second switch to change an amount of the power signal flowing from the reference node to the first node.

Aspect 19 can include or use, or can optionally be combined with the subject matter of Aspect 18, to optionally include, in the step-up mode, sensing a magnitude of a current signal provided to a load circuit by the first inductor, and based on the sensed magnitude, using a control circuit to change or modulate a duty cycle of the first and second switches to provide a substantially continuous drive signal to the load circuit.

Aspect 20 can include or use, or can optionally be combined with the subject matter of one or any combination of Aspect 18 or Aspect 19 to optionally include, in the step-up mode, providing a substantially continuous, non-zero drive signal from the first inductor to a load circuit.

Each of these non-limiting Aspects can stand on its own, or can be combined in various permutations or combinations with one or more of the other Aspects or with one or more portions thereof.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The Kappa converter circuit, as introduced herein, can be configured for step-down (buck), step-up (boost), or buck-boost operation. The Kappa converter circuit can help reduce electromagnetic interference (EMI) relative to conventional buck, boost, or buck-boost topologies, such as without requiring additional input or output filter circuits. The Kappa converter circuit can help provide a high power handling capability and less DC resistance loss, for example due to a distribution of current signals through respective inductors. The Kappa converter circuit can include isolating inductors at its input and ground reference nodes such as to help reduce signal bounce or signal pulsations at supply and ground reference busses, thereby helping further reducing EMI noise due to switching in the circuit.

In an example, the Kappa converter circuit can have low DC resistance loss characteristics. For example, compared to a single-phase buck converter with equivalent current capability and total inductor value, the Kappa converter can exhibit less DCR ($I^2R$) loss due to a distribution of current signals. Compared to a two-phase buck converter with respective pairs of inductors and two pairs of switches, the Kappa converter uses a single pair of switches and exhibits less conduction loss.

In an example, the Kappa converter circuit can provide a non-inverted output signal relative to a signal at the input of the converter circuit. More particularly, the Kappa converter circuit can provide an output signal that has the same polarity as its corresponding input signal. The Kappa converter circuit can provide substantially continuous input and output current with reduced or minimized ripple and without requiring large capacitive filters at the input and output nodes.

In an example, when the Kappa converter is configured for step-up operation, the converter exhibits no right-half-plane (RHP) zero. In contrast, other boost topologies exhibit an intrinsic low frequency RHP zero that can limit converter bandwidth and slow transient behavior.

In an example, the Kappa converter circuit can include or use a controller or control circuit. Feedback or level-shifting circuitry can be provided to sense behavior of the converter circuit and adjust switching times or other converter behavior. In an example, the control circuit can receive information from a sense resistor configured to monitor a current load, and in response the control circuit can update a duty cycle of switches in the Kappa converter circuit to help maintain a continuous current output condition.

To illustrate the various potential features and advantages of the Kappa converter, the Kappa converter will be generally discussed in contrast with other buck, boost, and buck-boost topologies. The other topologies are introduced and discussed briefly below in the discussion of FIGS. 1-3.

Figure 1:
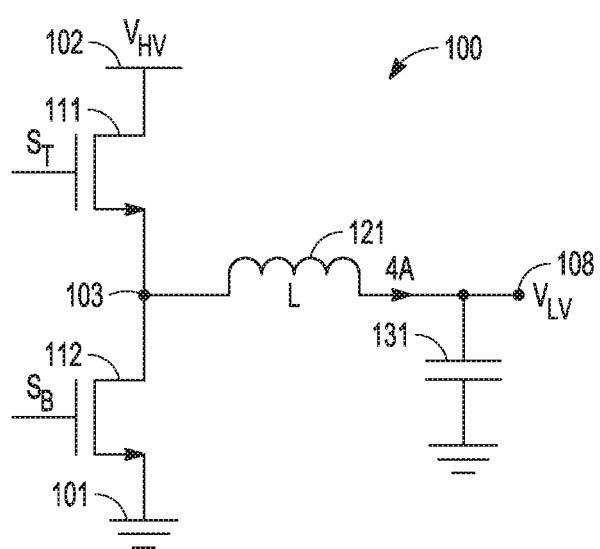
FIG. 1 illustrates generally an example of a single-phase buck converter.

FIG. 1 illustrates generally an example of a single-phase buck converter 100. The buck converter 100 can be configured to receive an input voltage signal $V_{HV}$ at a first node 102 and provide a regulated output voltage signal $V_{LV}$ at an output node 108. The buck converter 100 includes a first switch 111 configured to switch a signal path between the first node 102 and a second node 103, and the buck converter 100 includes a second switch 112 configured to switch a signal path between the second node 103 and a reference node 101. The buck converter 100 includes an inductor 121 in a signal path between the second node 103 and an output node 108. The output node 108 can be capacitor-coupled to the reference node 101, such as using a capacitor 131. The stepped-down or regulated output voltage signal $V_{LV}$ at the output node 108 has a signal magnitude that is less than a magnitude of the input voltage signal $V_{HV}$ and has some current ripple due to a duty cycle of the first and second switches 111 and 112.

In the example of FIG. 1, the first switch 111 is switched between open (non-conducting) and closed (conducting) configurations according to a first switching signal $S_T$, and the second switch 112 is switched between open and closed configurations according to a second switching signal $S_B$.

Generally, the first and second switching signals $S_T$ and $S_B$ are complementary such that the first switching signal $S_T$ is high when the second switching signal $S_B$ is low, and the first switching signal $S_T$ is low when the second switching signal $S_B$ is high. In the example of FIG. 1, the first switch 111 is coupled to a supply bus at the first node 102. Switching the first switch 111 can introduce switching noise or EMI to the supply bus, which can be detrimental to other circuitry that shares the same bus. That is, a pulsating signal at the first node 102 can introduce undesirable noise. In some examples, the noise can be mitigated using other filters or components.

In the example of the single-phase buck converter 100 of FIG. 1, the second node 103 is coupled to the first node 102 when the first switch 111 is in a closed configuration (e.g., the first switching signal $S_T$ is high and the second switching signal $S_B$ is low) and the second node 103 is coupled to the reference node 101 when the second switch 112 is in a closed configuration (e.g., the second switching signal $S_B$ is high and the first switching signal $S_T$ is low). As the input from the first node 102 flows and is modulated by the first and second switches 111 and 112, the resulting current is similarly modulated and introduces undesirable switching noise into the bus lines at the first node 102 and the reference node 101. The noise can interfere with one or more other circuits that can share the same bus lines.

In the example of FIG. 1, the single-phase buck converter 100 includes the inductor 121. The inductor 121 has an inherent resistance characteristic and therefore a DC resistance loss exists across the inductor 121. For a single-phase converter, the loss is calculated as $I_{121}^2 * R_{121}$ where $I_{121}$ is the current through the inductor 121 and $R_{121}$ is the resistance of the inductor 121. In the example of FIG. 1, if the output at the output node 108 includes a 4A current signal, then the DC resistance loss through the inductor 121 is $16 * R_{121}$. The single-phase buck converter 100 thus exhibits a relatively large power loss.

In the example of FIG. 1, the single-phase buck converter 100 includes the capacitor 131 at the output node 108. A value of the capacitor 131 can be specified according to the application of the converter. For example, the capacitor 131 can have a capacitance that is sufficiently large such that a current at the output node 108 is substantially continuous for a given output voltage level and duty cycle of the first switching signal $S_T$ and second switching signal $S_B$.

Figure 2:
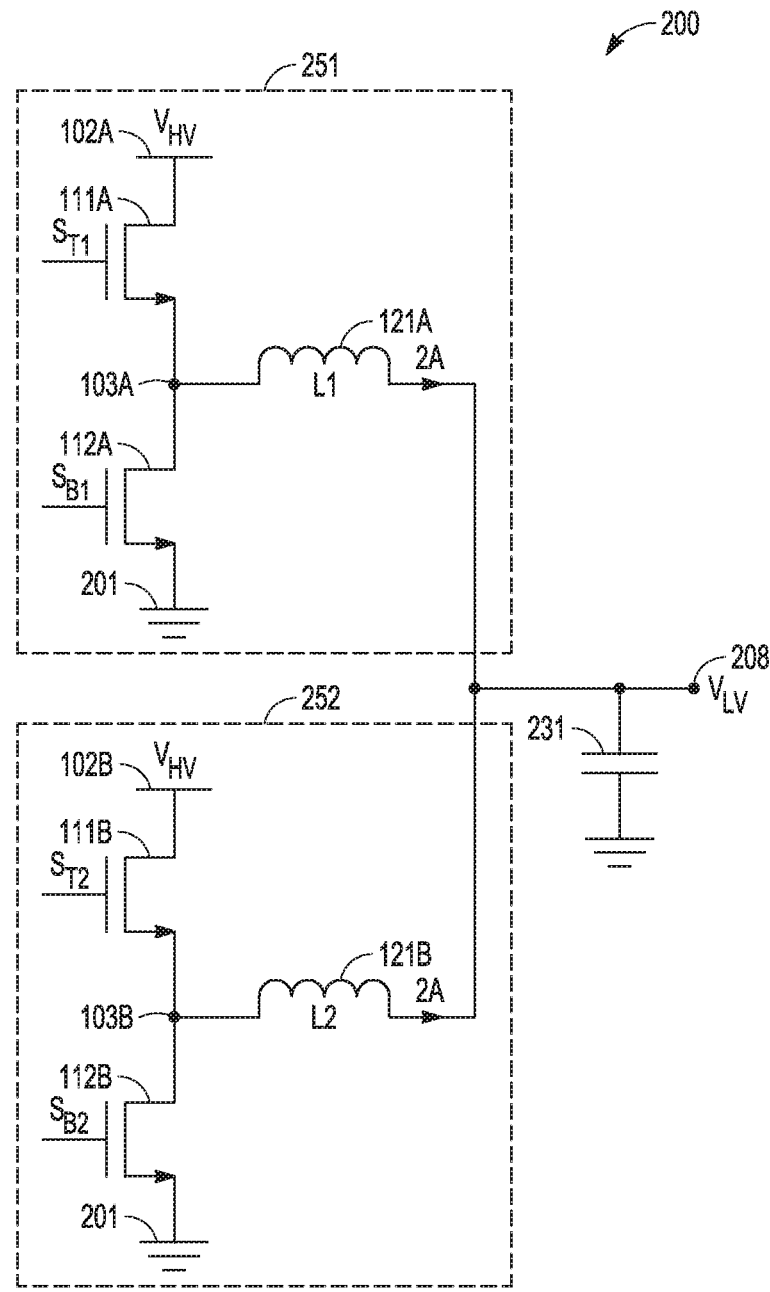
FIG. 2 illustrates generally an example of a two-phase buck converter.

FIG. 2 illustrates generally an example of a two-phase buck converter 200. The buck converter 200 can include a pair of switching stages such as a first-phase switching stage 251 and a second-phase switching stage 252. The first-phase and second-phase switching stages 251 and 252 can have substantially similar configurations in terms of components and function. In an example, the first-phase and second-phase switching stages 251 and 252 comprise respective buck converters with outputs that are coupled at a two-phase converter output node 208.

The first-phase switching stage 251 can include components similar to those in the example of the single-phase buck converter 100 of FIG. 1. Like-numbered components in FIGS. 1 and 2 can generally indicate the component have the same or similar configuration, function, or value. For example, the first-phase switching stage 251 can be configured to receive an input signal $V_{HV}$ at a first-phase input node 102A and provide a regulated output signal at a first-phase output node 108A. The first-phase switching stage 251 can include a first switch 111A configured to switch a signal path between the first-phase input node 102A and a first-phase switching node 103A. The first-phase switching stage 251 can include a second switch 112A configured to switch a signal path between the first-phase switching node 103A and a reference node 201. The first-phase switching stage 251 can include a first inductor 121A in a signal path between the first-phase switching node 103A and the first-phase output node 108A. The first-phase output node 108A can be capacitor-coupled to the reference node 201, such as using an output capacitor 231. In the example of FIG. 1, the first switch 111A is switched between open (non-conducting) and closed (conducting) configurations according to a first switching signal $S_{T1}$, and the second switch 112A is switched between open and closed configurations according to a second switching signal $S_{B1}$. Generally, the first and second switching signals $S_{T1}$ and $S_{B1}$ are complementary such that the first switching signal $S_{T1}$ is high when the second switching signal Sam is low, and the first switching signal $S_{T1}$ is low when the second switching signal $S_{B1}$ is high.

As similarly described above in the example of the single-phase buck converter 100 of FIG. 1, the first-phase switching node 103A can be coupled to the first-phase input node 102A when the first switch 111A is closed and the first-phase switching node 103A can be coupled to the reference node 201 when the second switch 112A is closed.

The first-phase switching stage 251 includes a first inductor 121A. The first inductor 121A has an inherent resistance characteristic and therefore a DC resistance loss exists across the inductor 121A. For the first-phase switching stage 251, the loss is calculated as $I_{121A}^2 * R_{121A}$ where $I_{121A}$ is the current through the first inductor 121A and $R_{121A}$ is the resistance of the first inductor 121A. In the example of FIG. 2, if the output at the first-phase output node 108A includes a 2A current signal, then the DC resistance loss through the first inductor 121A is $4 * R_{121A}$.

The second-phase switching stage 252 can be a second and discrete instance of the first-phase switching stage 251, such as comprising substantially or identically the same components, as indicated by the like-numbered components in FIG. 2. For example, the second-phase switching stage 252 can be configured to receive the input signal $V_{HV}$ at a second-phase input node 102B and provide a regulated output signal at a second-phase output node 108B. The second-phase switching stage 252 can include a third switch 111B, such as can be similarly or identically configured to the first switch 111A from the first-phase switching stage 251. The third switch 111B can be configured to switch a signal path between the second-phase input node 102B and a second-phase switching node 103B. The second-phase switching stage 252 can include a fourth switch 112B, such as can be similarly or identically configured to the second switch 112A from the first-phase switching stage 251. The fourth switch 112B can be configured to switch a signal path between the second-phase switching node 103B and the reference node 201.

The second-phase switching stage 252 can include a second inductor 121B in a signal path between the second-phase switching node 103B and the second-phase output node 108A. The second-phase output node 108B can be capacitor-coupled to the reference node 201, such as using the output capacitor 231. That is, the first-phase and second-phase output nodes 108A and 108B can be commonly coupled to the reference node 201 using the same output capacitor 231.

In the example of FIG. 2, the third switch 111B is switched between open (non-conducting) and closed (conducting) configurations according to a third switching signal $S_{T2}$, and the fourth switch 112B is switched between open and closed configurations according to a fourth switching signal $S_{B2}$. Generally, the third and fourth switching signals $S_{T2}$ and $S_{B2}$ are complementary such that the third switching signal $S_{T2}$ is high when the fourth switching signal $S_{B2}$ is low, and the third switching signal $S_{T2}$ is low when the fourth switching signal $S_{B2}$ is high. In an example, a controller circuit (not illustrated in the example of FIG. 2) provides the first, second, third, and fourth switching signals $S_{T1}$, $S_{B1}$, $S_{T2}$, and $S_{B2}$, such as based on a feedback signal that includes information about a current or voltage status of the two-phase converter output node 208. In an example, the first and third switching signals, $S_{T1}$ and $S_{T2}$, are substantially the same or have the same duty cycle, and the second and fourth switching signals, $S_{B1}$ and $S_{B2}$, are substantially the same or have the same duty cycle.

As similarly described above in the example of the single-phase buck converter 100 of FIG. 1, the first-phase switching node 103A can be coupled to the first-phase input node 102A when the first switch 111A is closed and the first-phase switching node 103A can be coupled to the reference node 201 when the second switch 112A is closed. Similarly, a second-phase switching node 103B can be coupled to a second-phase input node 102B when the third switch 111B is closed and the second-phase switching node 103B can be coupled to the reference node 201 when the fourth switch 112B is closed.

The second-phase switching stage 252 includes a second inductor 121B. The second inductor 121B can have substantially the same or similar characteristics to the first inductor 121A from the first-phase switching stage 251. In an example, the second inductor 121B has an inherent resistance characteristic and therefore a DC resistance loss exists across the second inductor 121B. For the second-phase switching stage 252, the loss is calculated as $I_{121B}^2 * R_{121B}$ where $I_{121B}$ is the current through the second inductor 121B and $R_{121B}$ is the resistance of the second inductor 121B. In the example of FIG. 2, if the output at the second-phase output node 108B includes a 2A current signal, then the DC resistance loss through the second inductor 121B is $4*R_{121B}$.

In an example, the first-phase switching stage 251 is configured to provide a 2A signal at the first-phase output node 108A and the second-phase switching stage 252 is configured to provide a 2A signal at the second-phase output node 108B. The signals at the first-phase output node 108A and the second-phase output node 108B can be summed at the two-phase converter output node 208 to provide a 4A output signal at the output capacitor 231. In this example, the total DC resistance losses of the two-phase buck converter 200 can be calculated as $4*R_{121A}+4*R_{121B}$. If the first and second inductors 121A and 121B are similarly configured to the inductor 121 from the example of FIG. 1, then $R_{121}=R_{121A}=R_{121B}$ and the total DC resistance-based loss of the two-phase buck converter 200 is $8*R_{121}$ for a 4A output signal at the two-phase converter output node 208. In other words, the resistance-based losses of the two-phase buck converter 200 can be half of that for the single-phase buck converter 100 such as for the same output current signal. This reduction in power loss is provided at the expense of additional components over the single-phase design, leading to increased cost and implementation challenges. For example, relative to the single-phase design, additional switch devices and an additional inductor are used in the two-phase converter, and the controller circuit used to control the switch devices in the two-phase converter is configured to drive four switches instead of two.

In the example of FIG. 2, the first switch 111A and the third switch 111B are coupled to a supply bus at the input nodes 102A and 102B, respectively. Switching the first switch 111A and the third switch 111B can introduce switching noise or EMI to the supply bus, which can be detrimental to other circuitry that shares the same bus. Relative to a single-phase buck converter, the additional switches in the two-phase buck converter can introduce correspondingly more switching noise. In an example, the single-phase buck converter 100 and/or the two-phase buck converter 200 can use strict phase control from a controller circuit and accurate output current or voltage sensing to realize balanced inductor currents and to optimize output voltage ripple.

Figure 3:
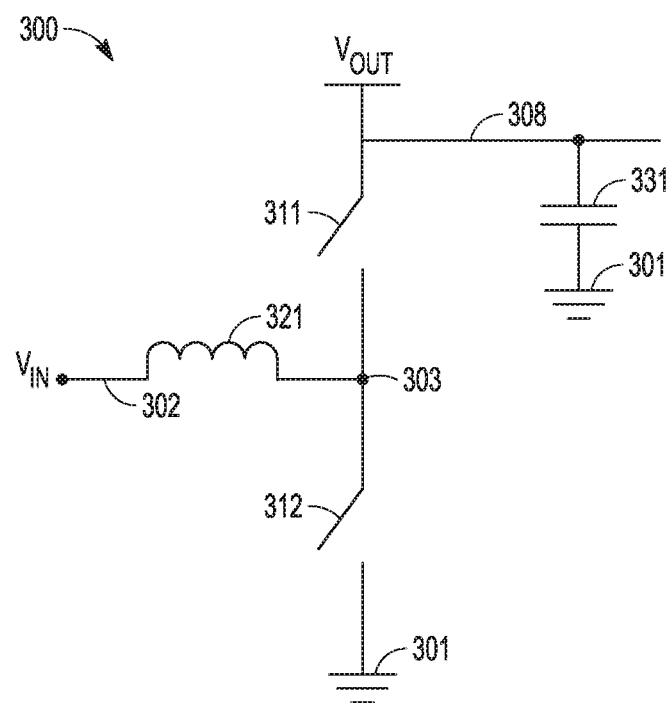
FIG. 3 illustrates generally an example of a boost converter.

FIG. 3 illustrates generally an example of a boost converter 300. The boost converter 300 is configured to receive an input signal $V_{IN}$ at a first node 302 and provide a stepped-up, regulated output signal $V_{OUT}$ at an output node 308. The boost converter 300 includes an inductor 321 coupled between the first node 302 and a switched node 303. The boost converter 300 includes a first switch 311 configured to switch a signal path between the switched node 303 and the output node 308, and the boost converter 300 includes a second switch 312 configured to switch a signal path between the switched node 303 and a reference node 301. The output node 308 can be capacitor-coupled to the reference node 301, such as using a capacitor 331. The stepped-up or regulated output signal $V_{OUT}$ at the output node 308 has a voltage magnitude that is greater than a magnitude of the input signal $V_{IN}$ and has some current ripple due to a duty cycle of the first and second switches 311 and 312. Since power is conserved and the output voltage is increased, a current at the output node 308 is decreased relative to a current at the first node 302.

In the example of FIG. 3, the first switch 311 is switched between open (non-conducting) and closed (conducting) configurations according to a first switching signal $S_{T3}$, and the second switch 312 is switched between open and closed configurations according to a second switching signal $S_{B3}$. Generally, the first and second switching signals $S_{T3}$ and $S_{B3}$ are complementary such that the first switching signal $S_{T3}$ is high when the second switching signal $S_{B3}$ is low, and the first switching signal $S_{T3}$ is low when the second switching signal $S_{B3}$ is high.

In an example, during operation, an input to the boost converter 300 from the first node 302 can be substantially continuous over an entire cycle. Accordingly, some size or inductance characteristics of the input filter, such as including the inductor 321, can be relaxed relative to, for example, similar characteristics on an output filter of a buck converter to ensure continuous operation.

In an example, the boost converter 300 can be configured to deliver current to the output node 308 when the first switch 311 is on and conducting. When the first switch 311 is off and non-conducting, however, then no current is provided at the output node 308 and the output is said to be discontinuous. To provide a substantially continuous output, the boost converter 300 can include or use a relatively large output capacitor 331 to smooth the output voltage and reduce output signal ripple. The output capacitor 331 can be large compared to an output capacitor in a buck converter, for example, to ensure continuous operation or to mitigate a pulsating output.

In an example, a boost converter can operate in a discontinuous mode, particularly under light loading conditions. In a discontinuous mode, the inductor 321 can discharge completely, and accordingly the output voltage can drop. Such a drop in the output can be detrimental or fatal in some applications. For example, a discontinuous mode may not be tolerated in an LED driver application that can use a constant current to support transient performance.

Other topologies can be used to provide voltage or current regulation, and each topology can have its attendant benefits and limitations. For example, a Cuk converter can include or use continuous input and output currents, however, a Cuk converter generally provides an inverted output relative to its input. Additional components or circuitry can be used appended to a Cuk converter to provide a non-inverted output. Generally, the additional components or circuitry include additional switches leading to increased complexity and control requirements. Furthermore, the switches in such a design can be coupled to ground or to a ground reference node, thereby contributing to additional noise.

In an example, a single-ended primary-inductor converter (SEPIC converter) can be used as an alternative to a traditional buck-boost configuration to provide an output signal that is greater than, less than, or equal to an input signal. An output of a SEPIC converter is similarly controlled by a duty cycle of its switches. However, an output current of a SEPIC converter can have a large pulse characteristic and can therefore require or use a relatively large output capacitor to smooth the output signal. Additionally, the switch in a conventional SEPIC converter can be coupled to ground, which can generate switching noise on the ground bus.

Kappa DC-DC Switching Converter Example

In an example, a Kappa converter can include a DC-DC switching converter that is configured to provide step-up and/or step-down output signals relative to an input signal. The various Kappa converter examples discussed herein are transformerless, however, other examples can include or use transformers for further step-up or step-down processing and/or for isolation. In an example, the Kappa converter can include multiple energy-storage components and two switches and can be configured to use a continuous input current and provide a continuous output current. In an example, the Kappa converter includes two inductors and a capacitor. The capacitor can be considered to be a "flying" capacitor because it can be decoupled from a static reference node such as ground.

In an example, the Kappa converter can be a bidirectional transformer that is configured to operate in various modes that can be similar to a buck converter, a boost converter, or a buck-boost converter. However, the Kappa converter can help provide various advantages relative to other buck, boost, or buck-boost configurations. For example, the Kappa converter can exhibit or generate less electromagnetic interference due to its limited number of switches and isolation of such switches from the supply rails or ground reference nodes.

The Kappa converter can include or use relatively small input or output filters, such as relatively low-valued capacitors or inductors. The Kappa converter can be configured to provide output power that is the same or similar to its buck, boost, or buck-boost relatives, and can exhibit less DC resistance losses due in part to a distribution of current through multiple inductors. In an example, the Kappa converter is non-inverting, meaning a polarity of its input is the same as a polarity of the converter's output.

Figure 4:
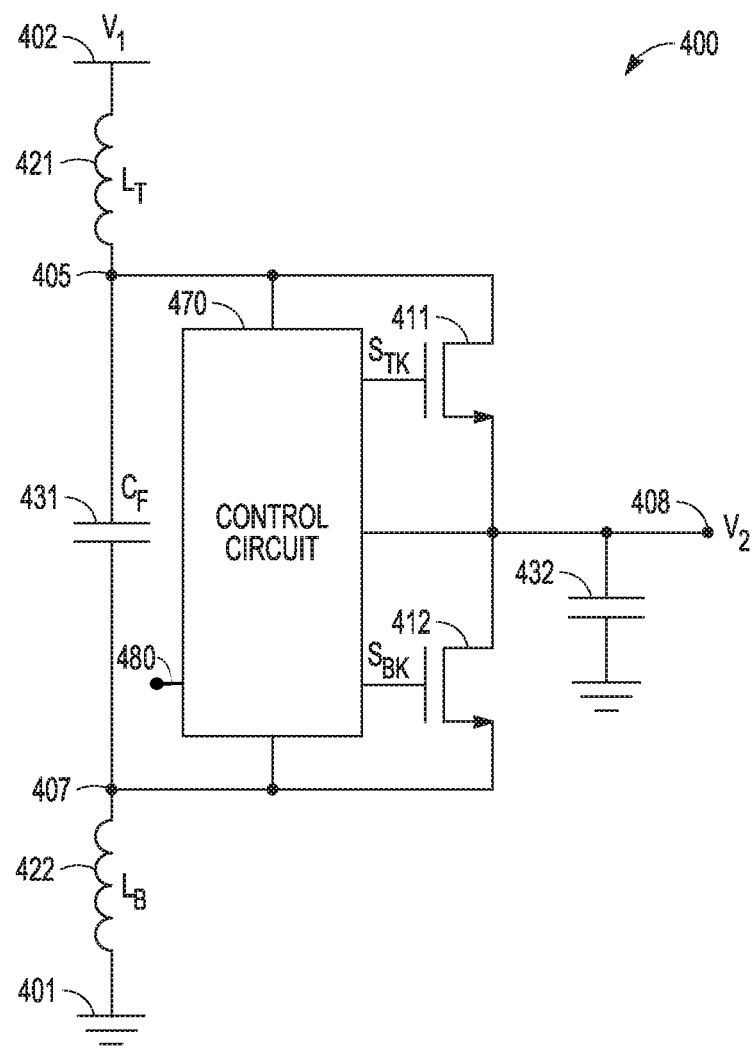
FIG. 4 illustrates generally an example of a Kappa converter.

FIG. 4 illustrates generally an example of a Kappa converter 400. The Kappa converter 400 can be configured for step-up, step-down, or step-up and step-down signal regulation. The Kappa converter 400 includes a first node 402, a first switching node 405, a second switching node 407, and a second node 408. In the example of FIG. 4, a first signal $V_1$ is provided at the first node 402, and a second signal $V_2$ is provided at the second node 408. Relative magnitudes of the signals at the first and second nodes 402 and 408 can change depending on an operating mode or current flow direction of the Kappa converter 400. For example, a magnitude of V1 at the first node 402 can be greater than a magnitude of V2 at the second node 408 when the Kappa converter 400 is configured for buck or step-down operation, and the energy is converted from V1 to V2. In an example, a magnitude of V1 at the first node 402 can be increased relative to an input source with a lesser magnitude of V2 at the second node 408 when the Kappa converter 400 is configured for step-up or boost operation. One or both of the first node 402 and the second node 408 can be coupled to a reference node using a capacitor. In the example of FIG. 4, the Kappa converter 400 is configured for step-down operation and the second node 408 is coupled to a reference node using a first filter capacitor 432.

The Kappa converter 400 can include a first inductor 421 with inductance $L_T$ and the first inductor 421 can be provided between the first node 402 and the first switching node 405. The Kappa converter 400 can include a second inductor 422 with inductance $L_B$ and provided between the second switching node 407 and a reference node 401. The reference node 401 can include a circuit ground or other reference. In the example of FIG. 4, the Kappa converter 400 includes a flying capacitor 431 with capacitance $C_f$. In an example, the flying capacitor 431 is coupled between the first and second switching nodes 405 and 407. In the example of FIG. 4, a voltage $V_C$ across the flying 431 can be substantially the same as a voltage of the first signal $V_1$ at the first node 402.

The Kappa converter 400 can further include first and second switches 411 and 412. The first switch 411 can be coupled between the first switching node 405 and the second node 408, and the second switch 412 can be coupled between the second switching node 407 and the second node 408. In the example of FIG. 4, the first switch 411 is switched between open (non-conducting) and closed (conducting) configurations according to a first switching signal $S_{TK}$, and the second switch 412 is switched between open and closed configurations according to a second switching signal $S_{BK}$. The first and second switching signals $S_{TK}$ and $S_{BK}$ can be complementary or overlapping depending on a desired operating condition of the Kappa converter 400. In an example, the first and second switching signals $S_{TK}$ and $S_{BK}$ can be pulse-width-modulated or PWM signals.

In an example, the Kappa converter 400 includes a control circuit 470. The control circuit 470 can be configured to drive the first and second switches 411 and 412, such as by generating or providing the first and second switching signals $S_{TK}$ and $S_{BK}$. In an example, the control circuit 470 is configured to receive information about signals at one or more of the first switching node 405, the second node 408, the second switching node 407, or elsewhere, and in response generate the first and second switching signals $S_{TK}$ and $S_{BK}$. That is, the first and second switching signals $S_{TK}$ and $S_{BK}$ can be based on signal activity or conditions in the Kappa converter 400 or elsewhere. In an example, the control circuit 470 can be configured to receive and use information about an output voltage signal from the Kappa converter 400 to thereby provide output voltage regulation.

In an example, the control circuit 470 can receive a power signal from, or can share power terminals with, the flying capacitor 431. That is, in an example, the control circuit 470 can be configured to drive the first and second switches 411 using power received from the flying capacitor 431, which power can be received from the first or second node 402 or 408. In an example, the control circuit 470 can include a control signal input 480 that is configured to receive a control signal that defines an operating mode of the Kappa converter 400. For example, in response to a first control signal at the control signal input 480, the Kappa converter 400 can be configured to operate as a step-down or buck converter. In response to a different second control signal at the control signal input 480, the Kappa converter 400 can be configured to operate as a step-up or boost converter. In response to a different third control signal at the control signal input 480, the Kappa converter 400 can be configured to operate as a step-down or step-up converter (stated differently, configured to operate as a buck-boost converter).

In an example, the various components of the Kappa converter 400 can be provided in an integrated circuit (IC) or other physically small power module. That is, the Kappa converter 400 can be provided as a molded and packaged system, or a substantially stand-alone module. A mode of operation of the converter system can be specified by, for example, one or more inputs to the control circuit 470. In an example, filters or other components can be coupled to the IC package-implemented Kappa converter 400 to further enhance its functions.

Kappa Converter Used as a Step-Down Converter

Figure 5:
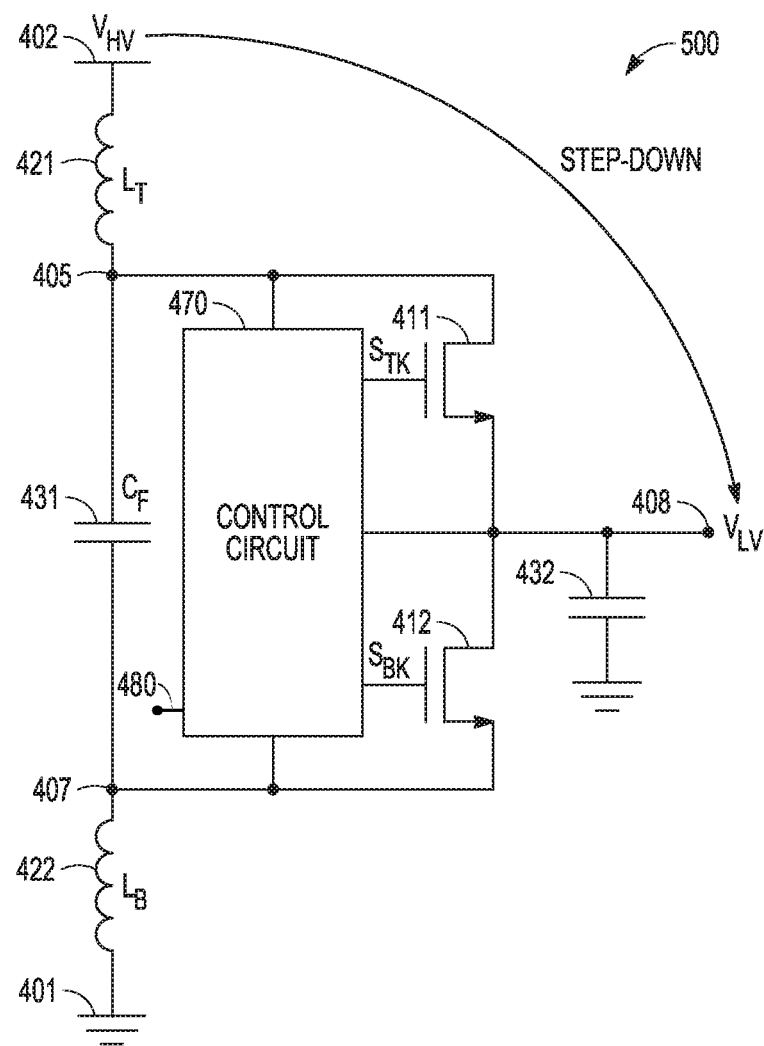
FIG. 5 illustrates generally an example of a step-down Kappa converter.

FIG. 5 illustrates generally an example of a step-down Kappa converter 500.

The step-down Kappa converter 500 includes or uses the Kappa converter 400 for step-down voltage regulation. For example, the step-down Kappa converter 500 is configured to receive a high voltage input signal $V_{HV}$ at the first node 402 and provide a stepped-down lower voltage output signal $V_{LV}$ at the second node 408. A continuity of the current at the second node 408 and a magnitude of the voltage of the output signal $V_{LV}$ at the second node 408 can be a function of the duty cycles of the first and second switches 411 and 412.

In the example of FIG. 5, a voltage across the flying capacitor 431 can be balanced to $V_{HV}$, corresponding to a voltage of the input signal at the first node 402. Over a first portion of a full switching cycle, a first current signal can flow from the first node 402, through the first inductor 421, through the first switch 411, and to the second node 408, and over a subsequent second portion of the full switching cycle, a second current signal can flow from the reference node 401, through the second inductor 422, through the flying capacitor 431, to the second node 408.

In an example, when the first switch 411 is turned on, such as when $S_{TK}$ is high, then a current through the first inductor 421 can ramp up based on the voltage signal across the first inductor 421. In the example of FIG. 5, the first switch 411 can be on when the second switch 412 is off, and the voltage across the first inductor 421 can be about $V_{HV}-V_{LV}$ over a first portion of a duty cycle D as a current flows from the first node 402 to a first switching node 405. Similarly, during the first portion of the duty cycle, a current through the second inductor 422 can ramp up based on a voltage signal across the second inductor 422. When the first switch 411 is on, then a voltage at the second switching node 407 can be about $V_{LV}-V_{HV}$ with a current flowing from the reference node 401 through the second inductor 422 and to the second switching node 407.

During a second portion of the duty cycle, the first switch 411 can be off and the second switch 412 can be on, and a magnitude of the voltage across the first inductor 421 can be the same as a magnitude of the output signal $V_{LV}$. When the second switch 412 is switched on, then the first switching node 405 can have a voltage of about $V_{LV}+V_{HV}$, and a voltage across the first inductor 421 can be $-V_{LV}$, and a current from the first inductor 421 can ramp down. Similarly, when the second switch 412 is on, a voltage across the second inductor 422 can be $-V_{LV}$, and a current from the second inductor 422 can ramp down.

Stated differently, the change in current through the first inductor 421 can be expressed as $D*(V_{HV}-V_{LV})/L_T$ over the first portion of the duty cycle, and can be expressed as $(1-D)*(V_{LV})/L_T$ over the second portion of the duty cycle. By equating the two expressions and rearranging terms, the relationship between the voltage input signal $V_{HV}$ and the voltage output signal $V_{LV}$ is $V_{HV}*D=V_{LV}$. This is the voltage conversion expression for a conventional buck converter, and the relationship is independent of the inductance. Accordingly, the same expression of the transfer function can be derived using the second inductor 422. In an example, the respective currents through the first and second inductors 421 and 422 can be asynchronous, unlike in a two-phase buck converter.

In an example, the step-down Kappa converter 500 can be a simpler or more power-efficient converter relative to single-phase or multiple-phase buck converters. For example, compared to a single-phase buck converter with equivalent current handling and total inductance, the step-down Kappa converter 500 can have less DC resistance loss ($I^2R$ loss from the first and/or second inductors 421 and 422) due to its distribution of current signals among the different inductors. In an example, compared to a two-phase buck converter, such as the two-phase buck converter 200 of FIG. 2, the step-down Kappa converter 500 includes two switches instead of four, and can have substantially non-pulsating and continuous input and output currents.

The step-down Kappa converter 500 can operate differently than a conventional buck converter in several ways. For example, the step-down Kappa converter 500 includes the first inductor 421 connected in series with the first node 402 or input terminal that receives a high voltage signal. The first inductor 421 can help the converter maintain a continuous input current state, which in turn can help reduce input signal ripple. In an example, the first inductor 421 can help mitigate EMI noise that is introduced into a bus associated with or coupled to the first node 402, such as by isolating the first node 402 from the switches in the converter. In an example, the first inductor 421 can help relax input filter requirements such as input capacitors that can be used in other buck converter topologies.

The step-down Kappa converter 500 can include the second inductor 422 coupled to the reference node 401. In the example of FIG. 5, each of the first and second switches 411 and 412 is thus isolated or decoupled from the reference node 401 or ground. This configuration can help reduce ground noise and can help reduce AC ground bouncing that can occur in conventional switching buck converters. Furthermore, function of the step-down Kapa converter 500 can be substantially immune to input or ground inductance, and thus the converter can support applications with long supply traces or ground traces.

Kappa Converter Used as a Step-Up Converter Example

Figure 6:
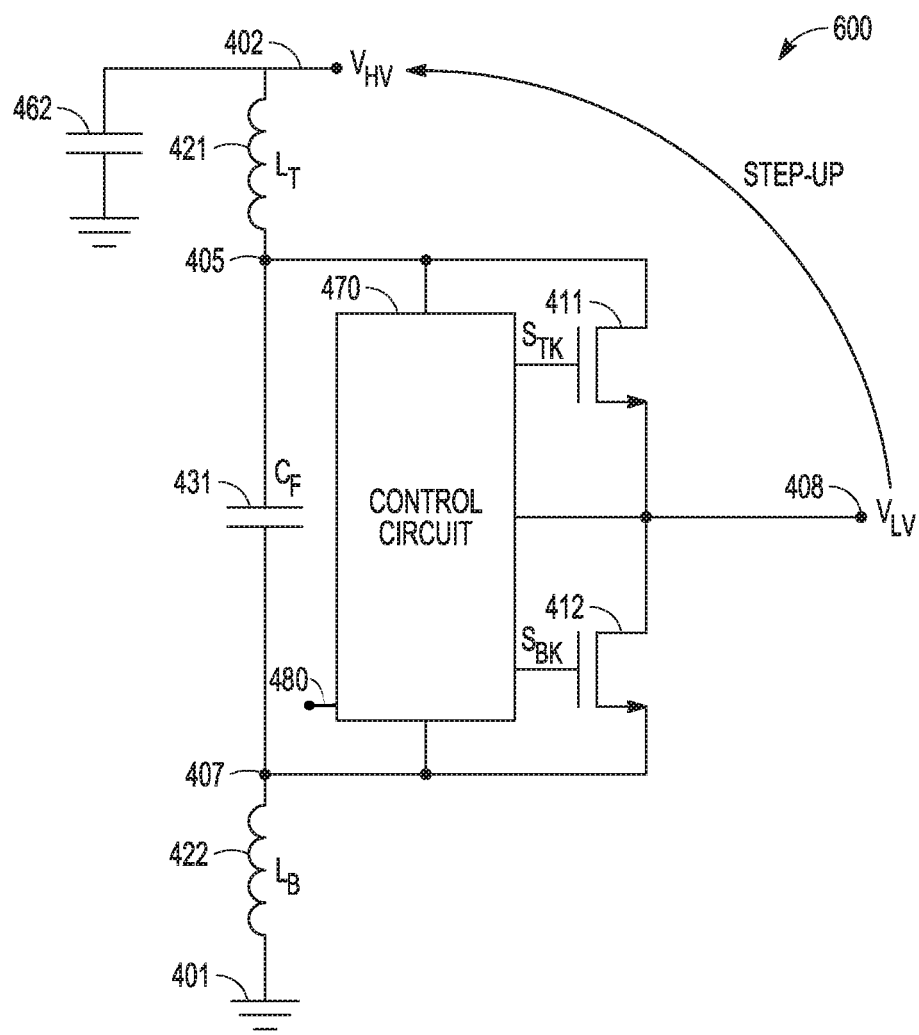
FIG. 6 illustrates generally an example of a step-up Kappa converter.

FIG. 6 illustrates generally an example of a step-up Kappa converter 600. The step-up Kappa converter 600 can include or use the Kappa converter 400 for step-up voltage regulation. For example, the step-up Kappa converter 600 is configured to receive a low voltage input signal $V_{LV}$ at the second node 408 and provide a stepped-up higher voltage output signal $V_{HV}$ at the first node 402. In the example of FIG. 6, the step-up Kappa converter 600 can include an output capacitor 462 coupled to the first node 402. A continuity of the current at the first node 402 and a magnitude of the voltage of the output signal $V_{HV}$ at the first node 402 can be a function of the duty cycles of the first and second switches 411 and 412.

In the example of FIG. 6, a voltage across the flying capacitor 431 can be balanced to $V_{HV}$, corresponding to the input signal at the second node 408. Over a first portion of a full switching cycle, a first current signal can flow from the second node 408, through the first switch 411, through the first inductor 421, and to the first node 402, and over a subsequent second portion of the full switching cycle, a second current signal can flow from the second node 408, through the first switch 411, through the flying capacitor 431, through the second inductor 422, and to the reference node 401. When the first switch 411 is turned on and with a voltage of $(V_{HV}-V_{LV})$ across the first inductor 421, a current from the first inductor 421 can flow can ramp down. When the second switch 412 is turned on, node 407 is $(V_{LV}-V_{HV})$, and a current in the second inductor 422 ramps down.

In an example, when the second switch 412 is turned on, such as when $S_{BK}$ is high, then a current through the second inductor 422 can ramp up based on the voltage signal across the second inductor 422. In the example of FIG. 6, the second switch 412 can be on when the first switch 411 is off, and the voltage across the second inductor 422 can ramp up to a voltage that is about $V_{LV}$ over a first portion of a duty cycle D. During a second portion of the duty cycle, the second switch 412 can be off when the first switch 411 is on, and the voltage at the first switching node 405 can be $V_{LV}$. Accordingly, a voltage across the first inductor 421 can be about $V_{LV}-V_{HV}$. Stated differently, the change in current through the second inductor 422 can be expressed as $D*V_{LV}/L_B$ over the first portion of the duty cycle, and can be expressed as $(1-D)*(V_{HV}-V_{LV})/L_B$ over the second portion of the duty cycle. By equating the two expressions and rearranging terms, the relationship between the voltage input signal $V_{LV}$ and the voltage output signal $V_{HV}$ is $V_{HV}=V_{LV}/(1-D)$. This is the voltage conversion expression for a conventional boost converter, and the relationship is independent of the inductance.

In an example, a conventional boost converter, such as the boost converter 300 from the example of FIG. 3, can exhibit a right-half-plane (RHP) zero that limits the bandwidth of the converter and detracts from a transient response. An RHP zero can be caused when the inductor is decoupled or disconnected from the converter load. When this happens, the converter output voltage can drop and a command signal can be issued to try to resolve the output. After a time constant associated with the RHP zero elapses, the output can begin to increase again according to the control signal. That is, due to an RHP zero, a conventional boost converter may be slow to respond to control signal changes.

The step-up Kappa converter 600, however, does not include a configuration that can be susceptible to an RHP zero issue. That is, the step-up Kappa converter 600 can provide enhanced transient response relative to a conventional boost converter because a current in the first inductor 421 can be continuous over an entire switching cycle. That is, in the step-up Kappa converter 600, the first inductor 421 can be coupled to the load over the entire cycle. Accordingly, the step-up Kappa converter 600 can have a relatively wide bandwidth and fast transient response relative to a conventional boost circuit.

Kappa Converter Used as a Buck-Boost Converter

Figure 7:
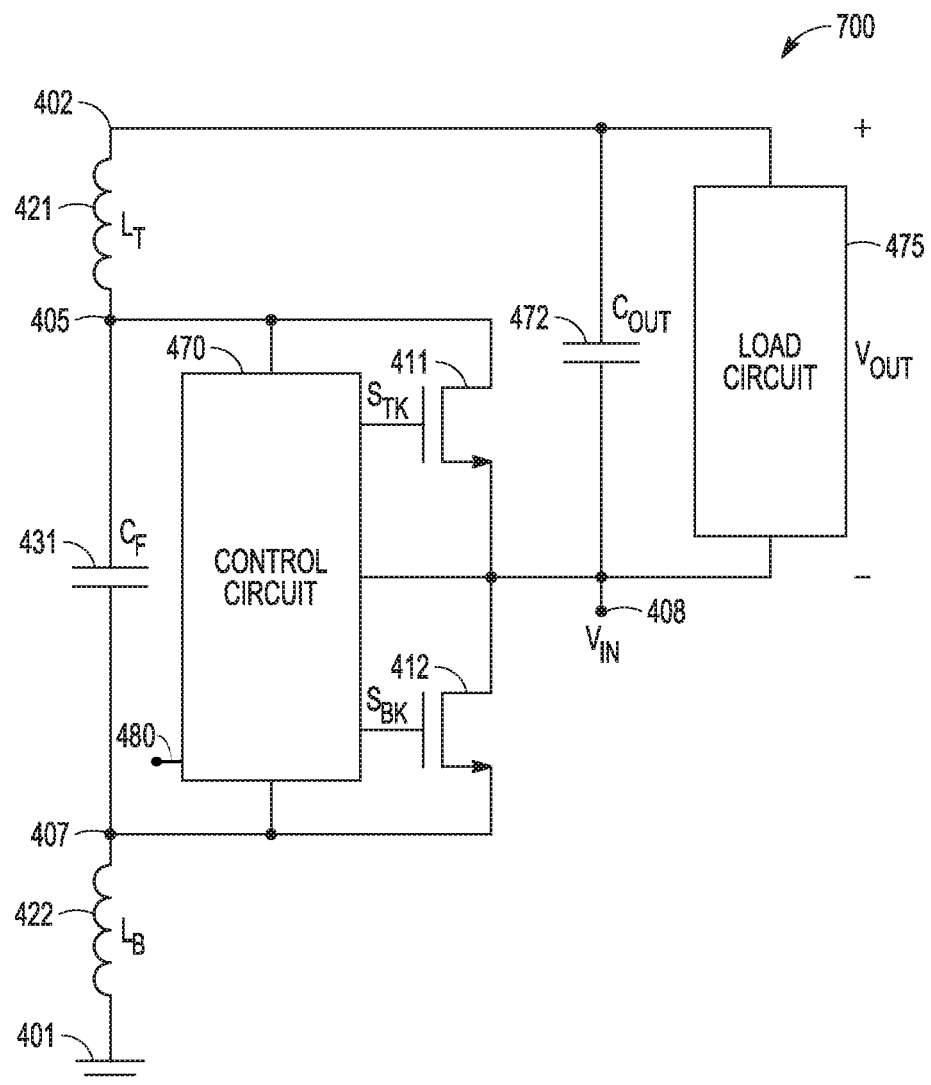
FIG. 7 illustrates generally an example of a buck-boost Kappa converter.

FIG. 7 illustrates generally an example of a buck-boost Kappa converter 700. The buck-boost Kappa converter 700 can include or use the Kappa converter 400 for step-up or step-down voltage regulation. In the example of FIG. 7, the buck-boost Kappa converter 700 is configured to receive an input signal $V_{IN}$ at the second node 408. The buck-boost Kappa converter 700 includes an output capacitor 472 coupled between the first node 402 and the second node 408, and an output signal $V_{OUT}$ can be provided across the terminals of the output capacitor 472. In an example, a load circuit 475 can be coupled in parallel with the output capacitor 472.

In the example of FIG. 7, the flying capacitor 431 can be charged to an output voltage signal $V_{OUT}$. When the second switch 412 is turned on, such as when $S_{BK}$ is high, then a current through the first inductor 421 can ramp up based on the voltage signal across the first inductor 421. In the example of FIG. 7, the first switch 411 can be off when the second switch 412 is on, and the voltage across the first inductor 421 can ramp up to a voltage that is about $V_{IN}$ over a first portion of a duty cycle D. During a second portion of the duty cycle, the first switch 411 can be on when the second switch 412 is off, and the voltage across the first inductor 421 can be $-V_{OUT}$. In other words, a current in the first inductor 421 over the first portion of the duty cycle can be expressed as $D*V_{IN}/L_T$, and the current in the first inductor 421 over the second portion of the duty cycle can be expressed as $(-V_{OUT}/L)(D-1)$. A voltage conversion expression for the buck-boost Kappa converter 700 can be derived by equating these expressions for the current in the first inductor 421. For example, $V_{OUT}=V_{IN}*(D/(1-D))$. This is the voltage conversion expression for a conventional buck-boost converter, and the relationship is independent of the inductance.

Figure 8:
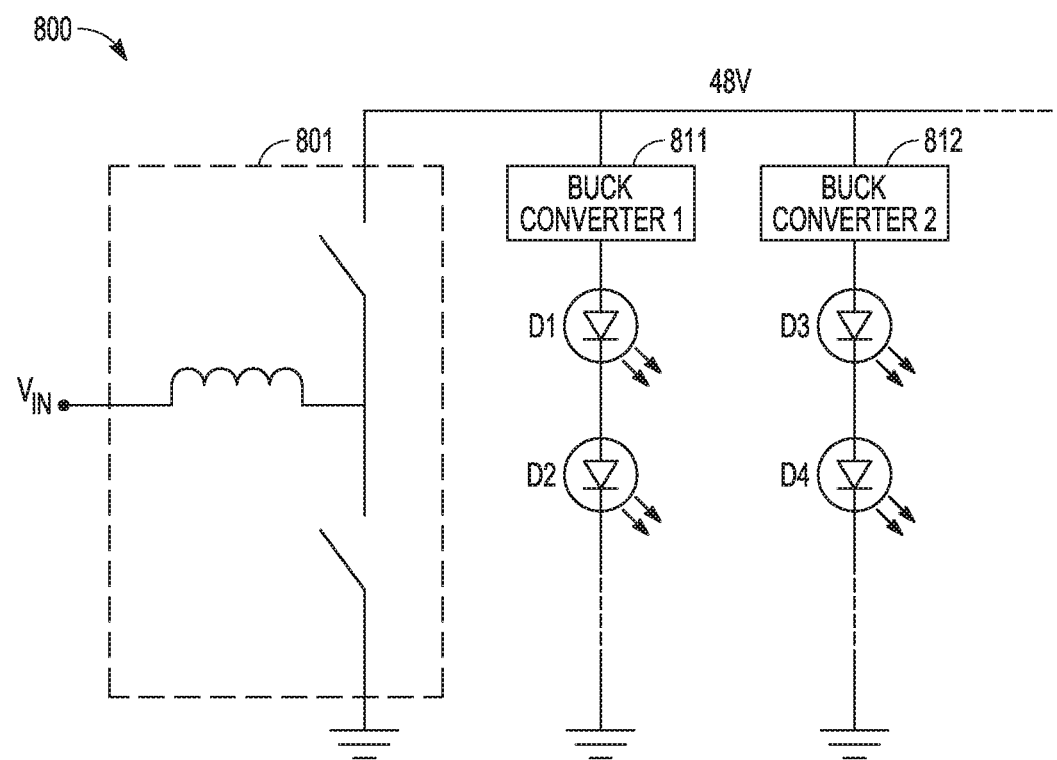
FIG. 8 illustrates generally an example of an LED driver circuit that can include or use multiple different converters.

FIG. 8 illustrates generally an example of an LED driver circuit 800 that can include or use multiple different converters. For example, the LED driver circuit 800 can include a boost stage 801 that is configured to receive an input $V_{IN}$ and provide a boosted output, such as at 48V, to a supply bus. The supply bus can be coupled to one or multiple parallel loads or circuit legs that can provide power regulation for various LED devices. For example, the supply bus can be coupled to a first buck converter 811 that is configured to step-down the bus voltage to a specified value for one or more LEDs in a first leg, such as D1 and D2 in the example of FIG. 8. The supply bus can be coupled to a second buck converter 812 that is configured to step-down the bus voltage to a specified value for one or more other LEDs, such as D3 and D4 in a second leg. The different legs of LEDs can have different numbers or types of LEDs such as can have different voltage or current requirements. The example of FIG. 8 includes two legs, however, additional or fewer legs can be used, such as with the same supply bus.

The LED driver circuit 800 can be configured to include or use one or more controllers to provide control signals to the switches in the boost stage 801, the switches in the first buck converter 811, the switches in the second buck converter 812, and/or switches in one or more other stages or converters that can be coupled to the supply bus. Thus, the LED driver circuit 800 can present implementation challenges due in part to the different control schemes used by the several different converters. For instance, if a common controller is used for the LED driver circuit 800, then the common controller will generate control signals for both buck and boost converter circuits, and may use feedback information from multiple different portions of the circuit.

Figure 9A:
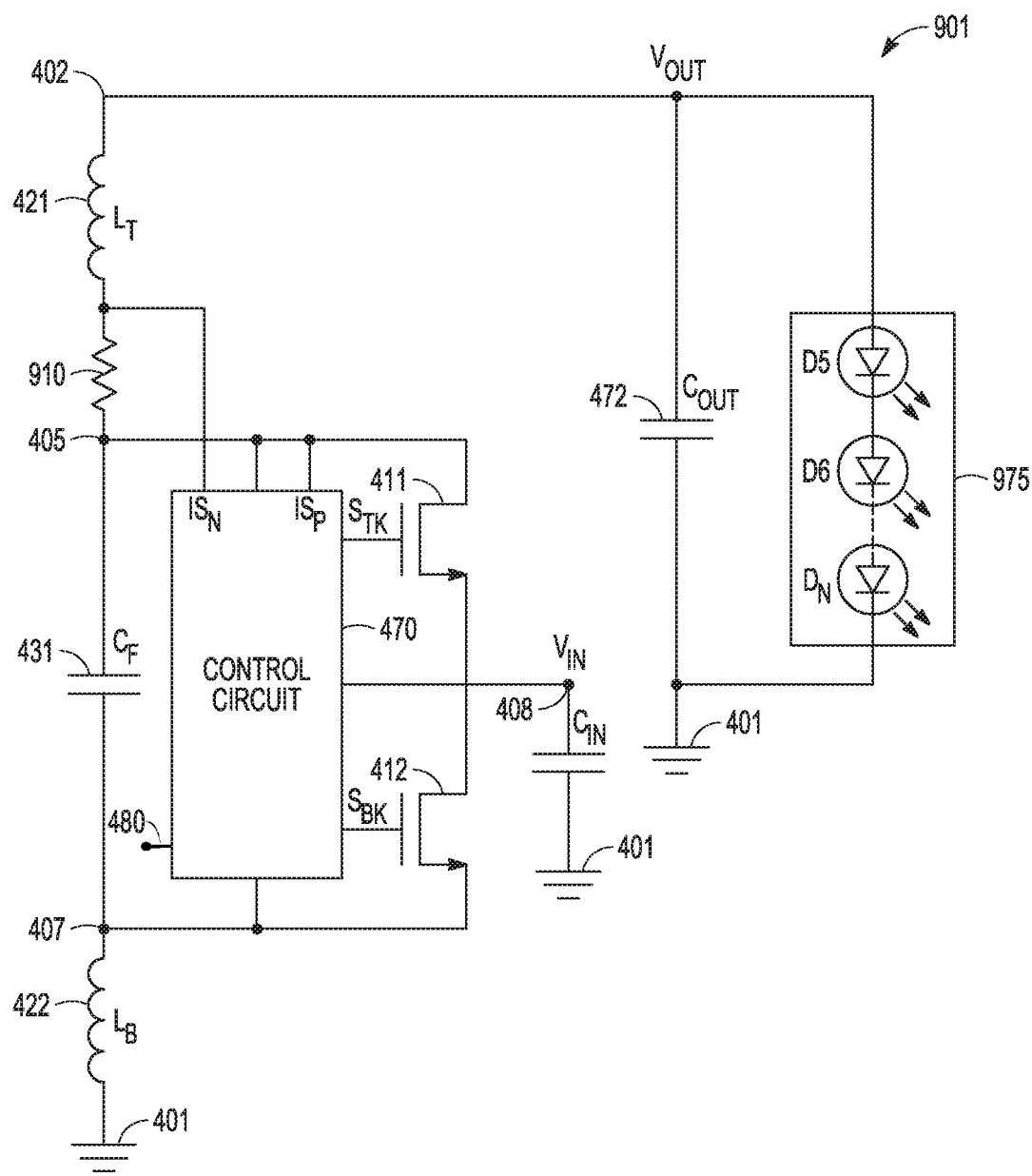
FIG. 9A illustrates generally a first example of a Kappa boost converter driving one or more LEDs.

FIG. 9A illustrates generally a first example 901 of a step-up or boost Kappa converter for driving one or more LEDs. The first example 901 can include substantially similar components as the step-up Kappa converter 600 from the example of FIG. 6. The first example 901 includes a load that is coupled between the first node 402 and the ground reference node 401.

The first example 901 includes a first resistor 910 provided in series with the first inductor 421. The first resistor 910 is configured as a sense resistor to sense information about a current drawn through the first inductor 421 and provided to or consumed by the load.

The first example 901 includes an LED apparatus 975 as the load circuit connecting to output of $V_{HV}$ from the example of FIG. 6. The LED apparatus 975 is illustrated as including LED devices D5, D6, and $D_N$; however, fewer or additional devices can similarly be used.

In the example of FIG. 9A, the LED devices can be arranged in series, and the series-coupled LED devices can be coupled between the first node 402 and the reference node 401. In an example, various other switches or circuitry can optionally be provided to facilitate switching the LED devices on or off independently and, in an example, the power signal provided to the LED apparatus 975 can be adjusted substantially in real-time by the control circuit 470 to accommodate the LED devices in use at any given time. For example, by adjusting a duty cycle of the first and second switches 411 and 412, the output voltage signal $V_{OUT}$ can be increased or decreased according to the transfer function derived above for the step-up Kappa converter 600, that is, $V_{OUT}=V_{IN}/(1-D)$.

In an example, voltage or current information from the first resistor 910 can be used by the control circuit 470 to determine a duty cycle for the first and second switches 411 and 412, such as to maintain a constant or continuous current at the output of the converter. For example, the control circuit can include sense terminals $IS_P$ and $IS_N$ coupled to respective sides of the first resistor 910. Information from the sense terminals can be used by the control circuit 470 to monitor a current or voltage signal provided to the LED apparatus 975.

The first example 901 exhibits relatively low output ripple and can be used with relatively small output capacitors or filters, such as the output capacitor $C_{OUT}$ that is coupled in parallel with the LED apparatus 975. The first example 901 thus uses two switches to provide step-up or step-down conversion from an input signal at the second node 408, in contrast with the LED driver circuit 800 from the example of FIG. 8 that can include or use at least three switches.

Figure 9B:
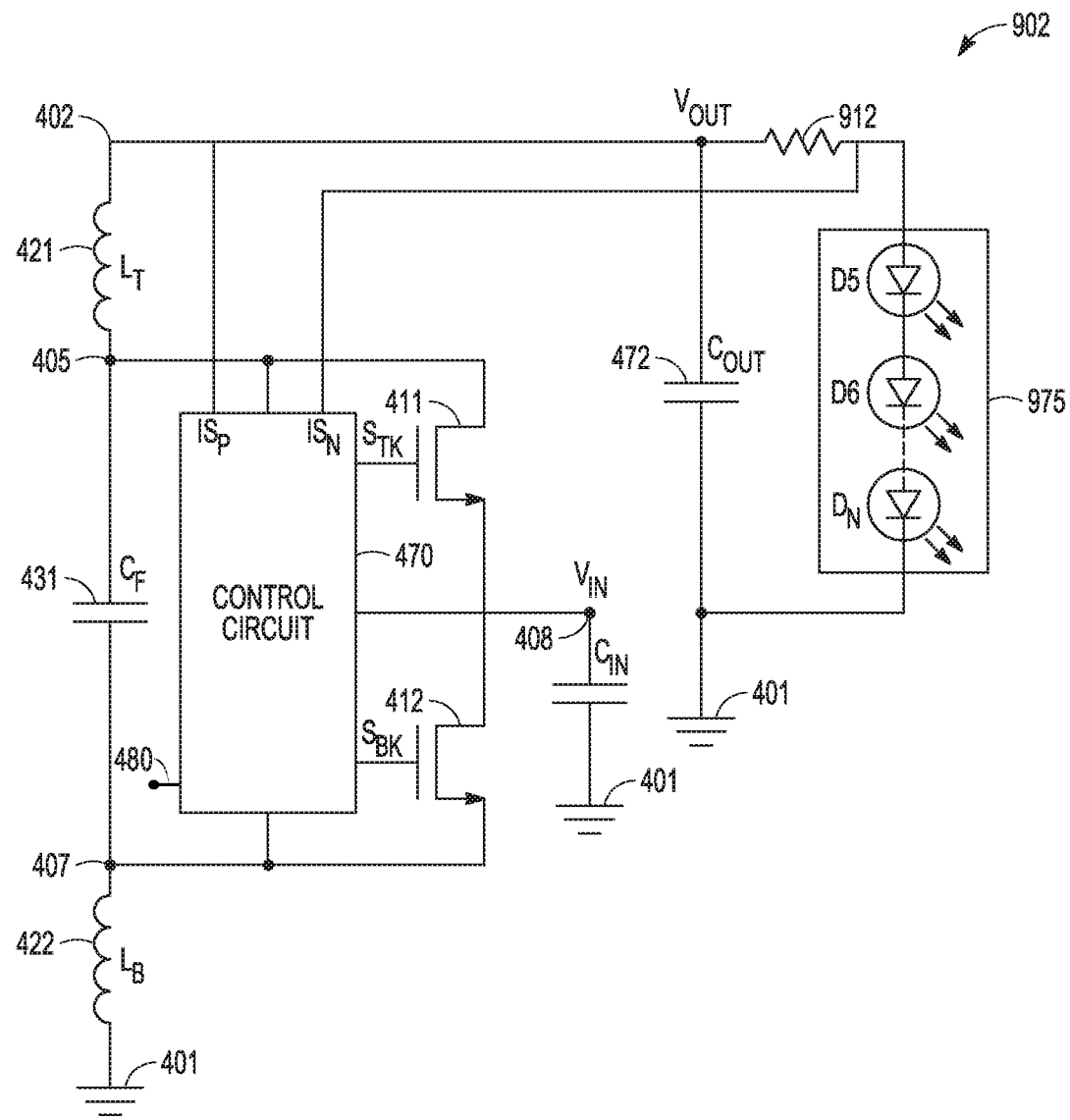
FIG. 9B illustrates generally a second example of a Kappa boost converter driving one or more LEDs.

FIG. 9B illustrates generally a second example 902 of a step-up Kappa converter for driving one or more LEDs. The second example 902 can include substantially the same components as the first example 901 from FIG. 9A. In FIG. 9B, however, instead of including the first resistor 910 coupled between the first inductor 421 and the first switch 411 as in FIG. 9A, the second example 902 includes a second resistor 912 coupled between the first node 402 and the LED apparatus 975.

In the example of FIG. 9B, one of the supply rails for the control circuit 470 can be coupled to the second switching node 407, and the second switching node 407 can have a variable signal level due to the switching behavior of the converter. The second example 902 can thus include or use a level-shifter between the second resistor 912 and the control circuit 470 to adjust or buffer the signals received at the sense terminals $IS_P$ and $IS_N$. The level-shifter can be omitted from the first example 901 from FIG. 9A, for example, because signal levels at the first and second switching nodes 405 and 407 fly or change together with the supply rails for the control circuit 470.

Figure 10:
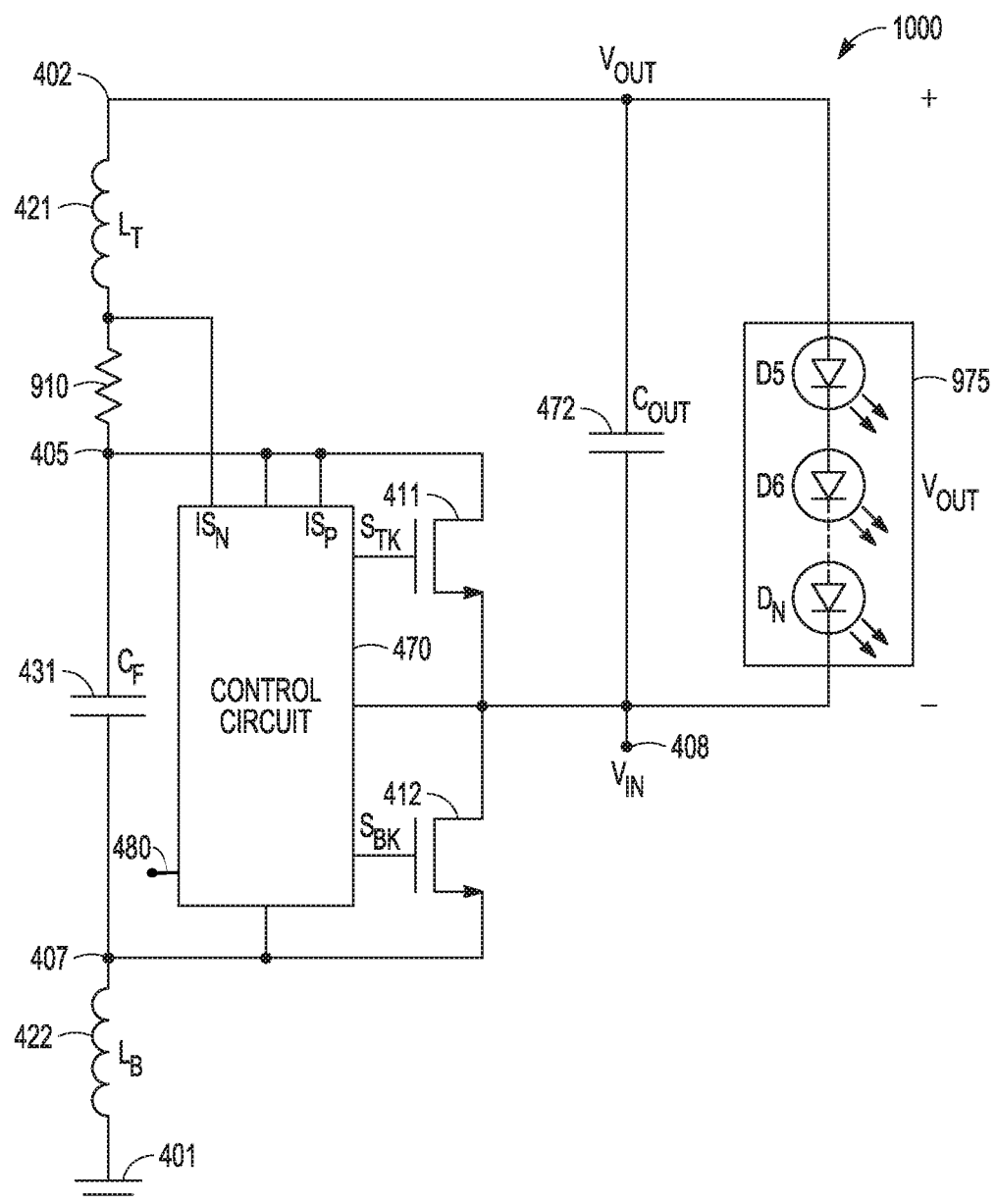
FIG. 10 illustrates generally a third example of a Kappa buck-boost converter driving one or more LEDs.

FIG. 10 illustrates generally a third example 1000 of a buck-boost Kappa converter for driving one or more LEDs. The third example 1000 can include substantially the same components as in the first example 901, such as including the first resistor 910 provided in series with the first inductor 421. The LED apparatus 975 is illustrated as including LED devices D5, D6, and $D_N$; however, fewer or additional devices can similarly be used.

In the example of FIG. 10, the LED devices in the LED apparatus 975 can be arranged in series and the series-coupled LED devices can be coupled between the first node 402 and the second node 408. This configuration can be contrasted with the first example 901 from FIG. 9 that includes the LED apparatus 975 coupled between the first node 402 and the reference node 401.

In an example, various other switches or circuitry can optionally be provided to facilitate switching the LED devices on or off independently and, in an example, the power or voltage signal provided to the LED apparatus 975 can be adjusted substantially in real-time by the control circuit 470 to accommodate the LED devices in use at any given time. For example, by adjusting a duty cycle of the first and second switches 411 and 412, the output voltage signal $V_{OUT}$ can be increased or decreased according to the transfer function derived above for the buck-boost Kappa converter 700, that is, $V_{OUT}=V_{IN}*(D/(1-D))$.

In an example, voltage or current information from the first resistor 910 can be sensed by the control circuit 470 and used to determine a duty cycle for the first and second switches 411 and 412, such as to maintain a constant or continuous current at the output of the third example 1000 circuit. Like the first example 901, the third example 1000 exhibits relatively low output ripple using two switches and can be used with relatively small output capacitors or filters.

Kappa Converter Control

In an example, the control circuit 470 can be configured to control operation of any one of the step-down Kappa converter 500, the step-up Kappa converter 600, or the buck-boost Kappa converter 700. That is, in an example device, the same control circuit 470 can be used to implement the several different converter topologies. For example, the control circuit 470 can be configured to receive or monitor information about signals at the various nodes of the converter circuits and then respond by generating the control signals $S_{TK}$ and $S_{BK}$ for the first and second switches 411 and 412. In an example, a converter circuit can include or use a sensor device, such as the first resistor 910, and information from the sensor can be received by the control circuit 470 and used to determine a duty cycle for the switch control signals.

In an example, the control circuit 470 is configured to receive information in a feedback loop. The feedback loop can monitor an output of the converter or one or more other nodes or aspects of the converter. In an example, when the control circuit 470 is configured for operation with the step-down Kappa converter 500, the control circuit 470 can receive information about the output voltage signal $V_{LV}$ at the second node 408. In an example, the control circuit 470 can include or use a comparator circuit to compare the output voltage signal $V_{LV}$ with a specified reference value or target value, and the control circuit 470 can adjust the switch control signals based on the relationship between the output voltage signal $V_{LV}$ and the reference value or target value. When the control circuit 470 is configured for operation with the step-up Kappa converter 600, the control circuit 470 can receive information about the output voltage signal $V_{HV}$ at the first node 402. In an example, the control circuit 470 can be configured for operation with the buck-boost Kappa converter 700 and the control circuit 470 can receive information about the output voltage signal $V_{OUT}$ at the first node 402. In an example, the control circuit 470 can be configured for operation with the first example 901 converter and the control circuit 470 can receive information from the first resistor 910 corresponding to a current signal magnitude in the first inductor 421. For example, the information from the first resistor 910 can include information about a voltage across the first resistor 910 or about a current through the first resistor 910.

Various Notes & Examples

This detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. The present inventors contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein."

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A bidirectional switching power converter system that is operable in a first mode in which a power signal flows in a power signal path from a first node to a second node to provide a stepped-down power signal at the second node, and the power converter system is operable in a second mode in which a different power signal flows in the power signal path from the second node to the first node to provide a stepped-up power signal at the first node, the power converter system comprising:
   a switching circuit coupled to the second node;
   a capacitor provided in parallel with the switching circuit;
   a first inductor coupled between a first terminal of the capacitor and the first node;
   a second inductor coupled between a second terminal of the capacitor and a reference node; and
   a control circuit configured to provide switch control signals to respective switches in the switching circuit to configure the converter system to operate in the first mode or the second mode.

2. The power converter system of claim 1, wherein the switching circuit includes:
   a first switch in a signal path between the first terminal of the capacitor and the second node; and
   a second switch in a signal path between the second terminal of the capacitor and the second node.

3. The power converter system of claim 1, wherein the system is configured in the first mode as a single-phase step-down converter that is configured to receive a higher voltage input signal at the first node and provide a lower voltage output signal at the second node.

4. The power converter system of claim 1, wherein the system is configured in the second mode as a single-phase step-up converter that is configured to receive a lower voltage input signal at the second node and provide a higher voltage output signal at the first node.

5. The power converter system of claim 1, wherein the control circuit is configured to receive a power supply signal from a supply node, wherein the supply node is coupled to the first terminal of the capacitor.

6. The power converter system of claim 1, wherein the control circuit receives operating power from a node in the power signal path.

7. The power converter system of claim 6, wherein the capacitor is a flying capacitor and the control circuit receives power from the first and different second terminals of the flying capacitor.

8. The power converter system of claim 1, wherein in the first mode, an output signal at the second node has the same polarity as its corresponding input signal at the first node, and wherein in the second mode, an output signal at the first node has the same polarity as its corresponding input signal at the second node.

9. The power converter system of claim 1, wherein in the first mode, the system is configured to provide a continuous output signal at the second node, and wherein in the second mode, the system is configured to provide a continuous output signal at the first node.

10. A packaged, transformerless, switching power converter system, the system comprising:
 a dual-purpose first terminal configured to (a) in a buck converter mode, receive a high voltage first input signal, or (b) in a boost converter mode, provide a stepped-up output signal relative to a low voltage second input signal;
 a dual-purpose second terminal configured to (a) in the buck converter mode, provide a stepped-down output signal relative to the high voltage first input signal, or (b) in the boost converter mode, receive the low voltage second input signal;
 a first switch coupled to the dual-purpose second terminal and configured to selectively pass signals to or from the dual-purpose first terminal;
 a second switch coupled to the dual-purpose second terminal and configured to selectively pass signals to a reference node; and
 a control circuit configured to control the first switch and the second switch to operate the system in one of the buck or boost converter modes or in a buck-boost converter mode.

11. The system of claim 10, further comprising:
 a control signal input, wherein the
 control circuit is configured to receive a control signal from the control signal input and, in response, control the first switch and the second switch to operate the system in one of the buck or boost converter modes or in the buck-boost converter mode.

12. The system of claim 10, further comprising:
 a first inductor coupled between the dual-purpose first terminal and the first switch; and
 a second inductor coupled between the second switch and the reference node.

13. The system of claim 12, further comprising a capacitor coupled between the first and second inductors.

14. The system of claim 12, wherein in the buck converter mode, the second terminal is configured to provide a continuous and non-inverted output current signal relative to the high voltage first input signal, and wherein in the boost converter mode, the first terminal is configured to provide a continuous and non-inverted output current signal relative to the low voltage second input signal.

15. The system of claim 12, further comprising:
 a sensing resistor coupled to the first terminal; and
 one or more LED devices coupled between the sensing resistor and the second terminal;
 wherein the control circuit is configured to receive information about a current signal in the resistor and, in response, control the first and second switches to provide a substantially continuous power signal to the one or more LED devices at the first terminal.

16. A method for stepping up or stepping down a power signal using a converter system having a dual-purpose first node, a dual-purpose second node, a switching circuit including first and second switches, a capacitor provided in parallel with the switching circuit, a first inductor coupled between a first terminal of the capacitor and the first node, and a second inductor coupled between a second terminal of the capacitor and a reference node, and a control circuit for controlling the first switch and the second switch, the method comprising:
 in a step-down mode, controlling, using the control circuit, the first switch in a first power signal path to change an amount of a first power signal flowing from the first inductor to the second node, and controlling, using the control circuit, the second switch in a shunt path to change an amount of the power signal flowing from a reference node to the second node; and
 in a step-up mode, controlling, using the control circuit, the first switch in the first power signal path to change an amount of a power signal flowing from the second node to the first inductor, and controlling, using the control circuit, the second switch to change an amount of the power signal flowing from the reference node to the first node.

17. The method of claim 16, further comprising, in the step-up mode,
 sensing a magnitude of a current signal provided to a load circuit by the first inductor, and
 based on the sensed magnitude, using a control circuit to modulate a duty cycle of the first and second switches to provide a substantially continuous drive signal to the load circuit.

18. The method of claim 16, further comprising, in the step-up mode, providing a substantially continuous, non-zero drive signal from the first inductor to a load circuit.

* * * * *